Patented Jan. 7, 1947

2,413,719

UNITED STATES PATENT OFFICE 2,413,719

TERPENE PRODUCT AND PREPARATION THEREOF

Donald A. Lister, Brunswick, Ga., assignor to Hercules Powder Company, Wilmington, Del., a corporation of Delaware No Drawing. Application April 24, 1943, Serial No. 484,481

15 Claims. (Cl. 260—631.5)

This invention relates to a process for the preparation of freely water-soluble terpene products and more particularly to preparation of such products from terpinolene by simultaneous oxidation and hydration. It also relates to the novel products obtained thereby.

I have discovered that the terpene or terpene hydrocarbon fraction boiling within the range of about 180° C. to about 195° C. and having a specific gravity within the range of about 0.855 to about 0.873, which I believe to be chiefly terpinolene, may be reacted with elemental free oxygen, such as atmospheric oxygen or air, and with water to produce material freely soluble in water. The freely water-soluble material has been found to be a mixture of unsaturated compounds, including unsaturated terpene trihydric alcohols with hydroxyls in glycollic arrangement, which are crystalline when isolated. In addition to these highly hydroxylated crystalline compounds, the water-soluble material comprises syrupy hydroxylated terpene derivatives not readily crystallized. The reaction also forms a useful water-insoluble oil which is partly polymeric and less oxygenated than the water-soluble material, as a by-product.

The method in accordance with this invention comprises mixing the terpinolene or the terpene hydrocarbon fraction boiling in the 180–195° C. range in liquid phase with water in the presence of free oxygen in the form of the pure gas or in the form of air or other gas containing free oxygen, and maintaining the contact of the terpene with oxygen and water until freely water-soluble products are formed. The reaction may be carried out at any temperature in the range from about 0° C. to about 90° C.; ordinarily room temperature is satisfactory although best yields are obtained at mildly elevated temperatures as between 30° C. and 70° C. Reaction temperatures up to 200° C. may be used but mostly water-insoluble products are formed at the higher temperatures.

It is desirable to keep the water phase and the water-immiscible terpene hydrocarbon phase of the reaction mixture in intimate contact with each other and with an oxygen-containing gas by vigorous agitation and/or emulsification of the reaction mixture. The reaction mixture may be agitated in contact with an oxygen-containing gas or the gas may be bubbled through the mixture. To obtain substantially complete reaction between the terpene hydrocarbon and water, it is necessary to keep the two immiscible phases intimately admixed in the presence of an oxygen-containing gas for a period of from about 24 hours to about 3 weeks or more.

The prolonged reaction time may be shortened materially by conducting the reaction under a pressure of oxygen in excess of that exerted by atmospheric oxygen. Any convenient pressure may be used, for example, from atmospheric to 1000 atmospheres or more, 10–100 atmospheres being usual. Using 10–20 atmospheres oxygen pressure permits reaction in a period as short as about six hours. Air under pressure is entirely suitable.

Upon formation of appreciable water-soluble material, or upon completion of the reaction, the reaction mixture is permitted to separate into an oily layer and an aqueous layer. The oily water-insoluble oxygenated by-product may be separated from the oily layer, if desired, by removal of unreacted terpenes by distillation, preferably at reduced pressure. The water-soluble products may be recovered from the water layer, if separation is desired, by evaporation of the water under vacuum. Since excessive heat decomposes the water-soluble products by a dehydration reaction, evaporation of the water layer is desirably carried out at a temperature not in excess of 60° C. and at an absolute pressure below about 25 mm. of mercury. The water-soluble products may be further separated by crystallization from the resulting syrup.

The terpene hydrocarbon or terpene fraction reacted with water and oxygen will boil within the range of about 180° C. to about 195° C. at 760 mm. pressure, will have a specific gravity of about 0.855 to about 0.873

$$\left(\frac{15.6° \text{ C.}}{15.6° \text{ C.}}\right)$$

and will have a refractive index between about 1.4750 and about 1.4900. Preferably it will boil within the range of about 187° C. to about 191° C., will have a specific gravity of about 0.860 to about 0.865

$$\left(\frac{15.6° \text{ C.}}{15.6° \text{ C.}}\right)$$

and will have a refractive index of about 1.4883 to about 1.4890. It is believed to be terpinolene, although this identification is not positive, due to conflicting physical constants given for terpinolene in the literature. Hereinafter, when the term "terpinolene" is used, it will be understood that a terpene hydrocarbon cut having a boiling range of about 180° C. to about 195° C. and a specific gravity within the range of about 0.855 to about 0.873

$$\left(\frac{15.6° \text{ C.}}{15.6° \text{ C.}}\right)$$

or the purer preferred material is meant.

Terpinolene or mixtures rich in terpinolene may be used in the method in accordance with this invention. Various commercially available terpene "cuts" may be used, although it will be understood that the closer the boiling range of the "cut" is to 187° C. to 191° C., which represents terpinolene of fairly high purity, terpinolene of absolute purity being thought to boil at about 188° C., the more efficient the reaction will be. A terpene fraction boiling in the range of about 180° C. to about 195° C. and having a specific gravity within the range of 0.863 to 0.873, secured in the refining of crude wood turpentine, is satisfactory for the purpose. Likewise, a terpene mixture secured as a by-product of the manufacture of camphor, boiling within the range of about 180° C. to about 190° C. and sold under the trade name of "Terpene B" may be used. Likewise, substantially pure alpha-terpineol may be dehydrated with sodium acid sulfate and the resultant product fractionated to separate a cut with a boiling range of 187° C. to 191° C., which is particularly suitable for reaction in accordance with this invention.

Another example of a terpene fraction which is highly suitable is the "terpinolene cut" separated from crude wood turpentine, having substantially the following characteristics:

*A. S. T. M. distillation range*

| | °C. |
|---|---|
| 1st drop | 186.0 |
| 5% | 187.0 |
| 10 | 187.3 |
| 20 | 187.5 |
| 40 | 187.5 |
| 50 | 187.6 |
| 60 | 188.0 |
| 70 | 188.2 |
| 80 | 188.6 |
| 90 | 189.0 |
| 95 | 190.0 |

| | |
|---|---|
| Specific gravity | 0.8702 |
| Refractive index | 1.4857 |
| Specific rotation | +0.6 |

The relative proportions of terpinolene, or of a terpene fraction containing terpinolene, and of water used in the method in accordance with this invention will be determined by convenience of mixing to secure intimate contact between the two immiscible phases, provided, however, that water is present in excess of that required for reaction with the terpinolene present. It is preferable to have water present in considerable excess of the stoichiometric requirement of the reaction, which is one mol of water per mol of terpinolene.

Following are examples of simple procedures, in accordance with the method of this invention, which illustrate formation of the water-insoluble by-product and the water-soluble mixed product and recovery of these products in the form of crude mixtures.

*Example I*

A pure sample of terpinolene, made by the careful laboratory fractionation of a terpinolene "cut" obtained in the purification of crude wood turpentine, had the following composition:

| | |
|---|---|
| Specific gravity | 0.8706 |
| Boiling point °C | 187–188 |

Two hundred and eighty cubic centimeters of this terpinolene was stirred with 52 cc. of water for 24 hours at room temperature, in the presence of air. At the end of this time, 25 cc. more water was added and the stirring continued. Again at the end of the second 24 hours, 25 cc. more water was added and the agitation continued to a total of 96 hours. At the end of this time the oil layer of the reaction mixture had a volume of 129 cc. and the aqueous layer a volume of 226 cc. The aqueous layer contained the water-soluble alcohol derived from terpinolene. The aqueous layer was then separated without precipitating out dissolved oils. The water layer was freed from water by vacuum distillation, and dried by blowing with carbon dioxide. On cooling, the alcohol became semi-solid. The semi-solid material yielded 24.9% of water by tertiary alcohol breakdown, and 1.33% of water by secondary alcohol breakdown.

The oil layer which remained at the end of the reaction gave the following analysis:

| | |
|---|---|
| Specific gravity $\left(\frac{15.6° \text{ C.}}{15.6° \text{ C.}}\right)$ | 0.9290 |
| Refractive index | 1.4949 |
| Moisture per cent | 0.40 |
| Tertiary alcohol do | 36.2 |
| Secondary alcohol do | 14.5 |

Boiling Range:

| | °C. |
|---|---|
| 1st drop | 189 |
| 17% | 193 |
| 33% | 194 |
| 50% | 198 |
| 67% | 204 |
| 83% | 225 |
| 90% | 228 |

This analysis showed that the oil layer was comprised largely of secondary and tertiary terpene alcohols derived from terpinolene, which were not water-miscible.

As further illustration of the procedure in accordance with the process of this invention, the following example may be cited:

*Example II*

Three thousand grams of a terpene fraction composed approximately of two-thirds terpinolene and one-third terpinene, dipentene, water-insoluble terpene alcohols, etc. were agitated for a period of six days at room temperature with 600 grams of water in the presence of air. During this period the relative volume of the oil phase progressively decreased, with a corresponding increase in the volume of the water phase. At the end of the reaction period only a small amount of oil phase remained. This phase consisted largely of terpinene, dipentene, water-insoluble terpene alcohols and some water-soluble terpene alcohol; while the aqueous phase was comprised of water, water-soluble terpene alcohols, and some water-insoluble terpene alcohols produced by hydration, held in solution by the high proportion of water-soluble terpene alcohol present. The two phases were then separated by the usual means, and the water phase diluted with an equal volume of water. This dilution threw the water-insoluble components out of the solution, leaving the water-soluble alcohols in solution. The water was then evaporated from this aqueous solution under vacuum. The last trace of water was then removed by blowing with carbon dioxide. On cooling, the alcohol became semi-solid and then crystallized on standing. The crystalline material was then filtered from the mother liquor and washed with benzol to yield a white crystalline product. This product melted at approximately 120° C. (capillary method) and was freely soluble in water.

*Example III*

Two thousand cubic centimeters of terpinolene cut and 1000 cc. of water were agitated at a temperature of 26° C. to 35° C. for a period of 297 hours. During this entire time, a small stream of air was passed through the reaction mixture. The final product was poured into a separatory funnel and allowed to separate whereby 1050 cc. of oil and 2750 cc. of water layer were obtained.

The water layer was carefully evaporated on a steam bath at reduced pressure (2 cm. Hg), whereby 928 g. of a pale colored, water-soluble, viscous, liquid product was obtained. This viscous product is believed to be a mixture of water-soluble, trihydric alcohols. If permitted to stand over a period of time, a water-soluble alcohol slowly crystallizes out and can be recovered by filtration. This crystalline, water-soluble material has a melting point of about 120° C.

It is desirable, in evaporating the water from the water solution, to use a temperature not above about 50–60° C. (steam bath) and low pressures (1–5 cm.). The use of higher temperatures and higher pressures causes some chemical dehydration to take place, whereby a less water-soluble or water-insoluble product is obtained.

*Example IV*

A mixture of 500 milliliters of terpinolene and 500 milliliters of water, the latter recovered from a preceding hydration reaction involving terpinolene, where placed in an autoclave and vigorously shaken at a temperature of 65° C. for 5½ hours under a pressure of 1300 pounds per square inch gauge of air in the autoclave. At the end of this period the reaction product was removed from the autoclave and permitted to separate into an aqueous layer and an oily layer. The two layers were separated by decantation. The aqueous layer was evaporated at a reduced pressure at a temperature of 40–80° C. Upon evaporation of the water, there was recovered an evaporation residue of 252 grams of water-soluble hydroxylated terpene product derived from the terpinolene. This product largely crystallized upon standing for three weeks. The crystals were washed with benzene and dried; they were white and had a melting point of about 120–122° C.

Examples I through III illustrate procedures in which very long reaction periods were utilized. The reaction time may be materially reduced with like yields of like water-soluble products, or the yield may be increased in a given reaction time, or yield may be increased in a shortened reaction time if catalysts of an oxygen-carrying nature are added to the reaction mixture. The suitable catalysts fall into several groups. The preferred group comprises surface active solids such as activated carbon, Activated Alumina, flaked aluminum metal, activated silica, activated clays and the like. Activated carbon is most effective of the group. Another important group of oxygen-carriers comprises hydrohalides of basic nitrogen compounds, i. e., hydrohalides of amines and ammonia, for example, such compounds as ammonium chloride, ammonium bromide, ammonium iodide, pyridine hydrochloride, trimethyl ammonium chloride, trimethyl benzyl ammonium chloride, aniline hydrochloride, triethanolamine hydrochloride, methylamine hydrochloride, toluidene hydrochloride, aniline hydrobromide, and the like.

Another group of catalysts comprises compounds of elements which readily change in valence. Thus, compounds of lead, cobalt, manganese, cerium, vanadium, chromium, sulfur, selenium, such as, for example lead naphthenate, lead linoleate, lead abietate, cobalt naphthenate, cobalt linoleate, cobalt abietate, manganese naphthenate, manganese linoleate, manganese ricinoleate, potassium permanganate, manganese sulfate, potassium dichromate, chromium sulfate, vanadium sulfate, cerium sulfate, vanadium chloride, hydrogen sulfide, ethyl mercaptan, ethyl disulfide, selenium oxide, and so forth, are suitable and may be used as catalysts.

Still another group of catalysts are the organic peroxides such as benzoyl peroxide and peroxides formed by blowing air through monocyclic terpenes. The vacuum distillate of the water layer in the reaction products of Examples I through IV has catalytic properties.

Oxygen-carrying materials will, in general, be incorporated as catalysts in a quantity between about 0.1 and about 25% by weight of the terpene being reacted upon, although in most cases a quantity between about 0.5% and about 10% is preferred. However, the quantity utilized will be less than a quantity having substantial oxidizing action upon the terpene present by itself. Thus, where the oxygen carrier utilized happens to be a strong oxidizing agent, such as in the case of potassium permanganate, the quantity utilized will be less than sufficient to have any appreciable oxidizing effect per se upon the terpene. Strong oxidizing agents cause the formation of scission products or of ketone and acid products instead of the hydroxylated, freely water-soluble products desired. Hence, any material utilized as catalyst is used only in an oxygen-carrying quantity to transfer oxygen from the air slowly to the terpene being reacted upon, but not in such quantity to cause severe oxidation of the terpene or the water-soluble product.

It will be understood that use of pressure combined with use of catalysts gives most rapid reaction. Where large masses are reacted and reaction is accelerated by catalysts and/or pressure, so that reaction time may be reduced to as low as 0.5 to 6 hours, cooling means are preferably made available to control temperature at the desired level. The reaction is exothermic in all cases.

The examples following illustrate reactions essentially the same as in the previous examples but carried out in the presence of catalysts.

*Example V*

A mixture consisting of 1500 milliliters of water, 1500 milliliters of terpinolene, and 5 grams of ammonium chloride was agitated for 90 hours at a temperature of 38° C. while a slow stream of air was bubbled therethrough. The reaction product mixture was then permitted to separate into an aqueous and an oily layer which were separated by decantation. The aqueous layer was evaporated in vacuo at a temperature of 50–80° C. to obtain a yield of 565 grams of viscous, water-soluble liquid. Upon standing, this liquid partially crystallized to form water-soluble white crystals of polyhydric terpene alcohols, which had a melting point of 120° C.

Example VI

A mixture consisting of 10,000 milliliters of terpinolene, 10,000 milliliters of water, and 50 grams of Darco activated carbon was agitated for 63 hours at a temperature of 40° C. while a slow stream of air was bubbled through the mixture. At the end of this period, the reaction mixture was permitted to separate into two layers which were separated by decantation. Recovery of the water-soluble products of the aqueous layer was accomplished by evaporation of the water from the water layer at reduced pressure at a temperature of about 50-80° C. Four thousand three hundred forty-two grams of water-soluble terpene polyhydric alcohol were recovered. The snow white crystalline product obtained on standing melted at 119° C.

Example VII

A mixture consisting of 1500 milliliters of terpinolene, 1500 milliliters of water and 1 gram of potassium permanganate was agitated 144 hours at a temperature of 35° C. while bubbling a slow stream of air therethrough. Recovery of water-soluble product as in the manner of the previous example gave a yield of 772 grams.

Example VIII

A mixture consisting of 1500 milliliters of terpinolene, 1500 milliliters of water and 10 grams of cobalt naphthenate was agitated for 144 hours at a temperature of 35° C. while bubbling air therethrough. Recovery of water-soluble product was accomplished as in Example V.

Example IX

A mixture consisting of 1500 milliliters of terpinolene, 1500 milliliters of water and 7.5 grams of flake aluminum metal was agitated for 99 hours at a temperature of 35° C. while bubbling air therethrough. Recovery of water-soluble material in the manner of Example V gave a yield of 476 grams.

Example X

A mixture consisting of 500 milliliters of terpinolene, 500 milliliters of water and 5 grams of ammonium chloride was placed in an autoclave and the autoclave charged with air to a pressure of 1400 pounds per square inch. The autoclave was then vigorously shaken for 5½ hours at a temperature of 50° C. At the end of this period, the contents were removed from the autoclave, permitted to form two layers, and separated by decantation. Evaporation of the aqueous layer so obtained gave a yield of 203 grams of water-soluble product. Water-insoluble polyhydroxy products were recovered from the oily layer by removal of most of the unreacted terpinolene by steam distillation at reduced pressure.

It will be appreciated while in most cases the reaction mixture will chiefly consist of the terpinolene and the water, with the water in excess of that required to enter into reaction with the terpinolene. However, inert diluents, such as benzene, toluene, and especially such solvents for terpenes and for water as acetone, methylethyl ketone, ethyl acetate, methyl ether of ethylene glycol, ethyl ether of ethylene glycol, and the like may be present if desired. Other terpenes may also be present.

Usually the reaction will be started with the reactants substantially neutral. During the reaction a slight acidity develops. A small amount of an organic acid, for example, acetic acid, formic acid, propionic acid, oxalic acid and the like, may be added with the effect of increasing the rate of reaction. The acid will usually be less than about 2% of the water present; it is held at a quantity less than an amount which will cause substantial esterification of the trihydric alcohols formed in the reaction.

The products obtained by the method in accordance with this invention may be utilized in a number of forms. The water-soluble products constitute a syrupy mixture, useful as such, and may be recovered as a mixture with or without evaporation of the water present. Alternatively, the crystalline product of the examples may be recovered from the syrup.

The crystalline product initially appears to be a compound melting at approximately 120° C. However, close examination during melting reseals that a component melts as low as about 102° C. and that the last traces of solid disappear at about 128° C. The crystalline product is thus also a mixture of compounds.

The mixed crystalline product separates slowly from the dehydrated syrup. Solvent crystallization is much quicker and more complete. For example, crystallization of the mixed crystalline product from acetone usually gives a yield of about 45% of the syrup. The following example illustrates recovery of the mixed crystalline product with the aid of a solvent.

Example XI

A mixture of 300 parts by weight of terpinolene (95% pure, refractive index 1.48888), 300 parts by weight of water and 1.5 parts by weight of Darco activated carbon were agitated for 8 days in a bath held at 55° C. while air saturated with moisture was bubbled through the mixture. The mixture was then separated into two layers. The oily layer in this case consisted of 40 parts by weight of viscous liquid heavier than the aqueous layer. The aqueous layer was washed with 80 parts of benzene and then freed of water by vacuum distillation at 60° C. to form 330 parts of water-soluble syrup.

One hundred parts by weight of the syrup were dissolved in 400 parts by weight of acetone at a temperature of 56° C. The solution was then cooled to 15° C. and permitted to stand 24 hours until crystallization became complete. The white crystals which formed were separated from the solution, washed with benzene, and dried. A quantity of 45 parts by weight was recovered. The crystalline product had a melting range of 102-128° C. with most of the material melting at about 120° C.; it was substantially identical with the product formed by spontaneous crystallization from the syrup. The procedure of this example gave like results when applied to the water-soluble syrup obtained by the method of Examples I, V, VI and VII.

The method in accordance with this invention also includes within its scope the recovery of products having a sharp melting point. The mixed crystalline product having a wide melting range, or the water-soluble syrup, is dissolved, for example, in ethyl acetate and crystallized therefrom. The crystals forming in ethyl acetate are white and melt in a narrow range at about 135° C. Recrystallized from ethyl acetate or methanol, they melt at 135-136° C. The following example illustrates recovery thereof:

Example XII

The water-soluble syrup obtained by the procedure of Example XI was freed of water by vacuum distillation. One hundred parts by weight of the syrup were dissolved in 400 parts by weight of ethyl acetate at a temperature of 77° C. The solution was then cooled to 15° C. and permitted to stand 24 hours until crystallization became complete. The white crystals which formed were separated from the solution, washed with benzene, and dried. A quantity of 17 parts by weight was recovered. The crystalline product had a melting point of 135–136° C. The procedure of this example gave like results when applied to the water-soluble syrup obtained by the method of Examples I, V, VI and VII.

*Example XIII*

One hundred parts by weight of dehydrated water-soluble syrup obtained as in Example XII was dissolved in an equal part of ethanol at 60° C. The solution was cooled to 15° C. and then diluted with 1000 parts of benzene. Seventeen parts by weight of crystalline product with a melting point of 135–136° C. precipitated.

Crystallization to form the 135–136° C. melting product as in Examples XI and XII usually results in a yield of about 17% by weight of the original water-free syrup. The solvent may then be eliminated by evaporation and the residual syrup dissolved in boiling acetone as in Example XI. When the resulting solution is slowly cooled, a series of crystalline fractions is obtained. The first fractions are composed of the least soluble material; they melt at below 120° C. and are mixtures constituting about 17% of the original syrup. The later fractions melt sharply at 124–125° C. and represent about 10% of the original syrup. The mother liquor residuum, representing 50–60% of the whole water-soluble syrup, does not appear to be crystallizable further.

The various crystalline products hereinabove mentioned are believed to be isomers. All are higher in molecular weight than terpinolene. Combustion data and Zerewitinoff hydroxyl determinations (about 28% hydroxyl in each case) show the existence of three hydroxyl groups in each crystalline product. The crystalline products are all characterized by a bromine number indicative of one double bond. The mixed crystalline product has a bromine number of 80–100. The product melting at 135–136° C. has a bromine number of above 85, usually 90–102. The product melting at 124–125° C. has a bromine number of 50–60. The 135–136° C. melting product has a hydrogen absorption of about 1.04% by weight when hydrogenated with a nickel catalyst at 160° C. and a hydrogen pressure of 3000 pounds per square inch, showing the existence of one double bond in the molecule. The crystalline products are all believed to be trihydroxy paramenthenes in view of this data.

The crystalline unsaturated trihydroxy terpene alcohols lose hydroxyls by dehydration when heated, especially with dehydration catalysts such as sodium acid sulfate, sulfuric acid, phosphorus pentoxide and the like. The hydroxyls lost are on tertiary carbon atoms. The products are thus characterized by a tertiary hydroxyl content.

The 135–136° C. melting product is further characterized by the property of smoothly giving off about 18.5% of its weight of water with loss of 2 hydroxyl groups when in refluxing para-cymene (176° C.) in the presence of a small amount of iodine such as one small crystal of iodine to 25 grams of crystalline alcohol.

The 135–136° C. product is believed to have hydroxyls in adjoining positions, i. e., alpha-beta glycol arrangement, as it gives a positive periodic acid test reaction for this arrangement. This test is described in Schriner and Fuson, Systematic Identification of Organic Compounds, John Wiley and Sons, second edition, page 57.

The white crystalline unsaturated trihydroxy terpene alcohol melting at 135–136° C. has the following crystal constants, melting point and constants being determined upon crystals deposited from solution in ethyl acetate followed by recrystallization from methanol. (Terms and symbols used are as defined in "Dana's Textbook of Mineralogy," published by John Wiley and Sons, Inc., New York, 1932.)

Type—monoclinic
Appearance—transparent, colorless, predominantly thin-tabular on the basal pinacoid, slightly elongated parallel to the "b" axis.
Axial elements — $a:b$ = approximately 2.35:1. Beta—ca. 106°
Crystal forms—(001) dominant, (100), (110)
Optical orientation—obtuse bisectrix alpha=$b$ axis; acute bisectrix inclined 48°±2° to the $a$ axis in the obtuse angle beta
Optic angle $2V=49°\pm2°$
Dispersion—$r>v$, distinct
Birefringence—strong
Refractive index—1.510±0.003.

The white crystalline unsaturated trihydroxy terpene alcohol melting at 124–125° C. has the following crystal constants, melting point and constants being determined upon crystals deposited from solution in acetone:

Type—monoclinic
Appearance—transparent, colorless, predominantly short-prismatic.
Axial elements—$a:b:c=0.92:1:0.425$. Beta=94.5°
Crystal forms—(110) dominant, (001) (011) (100) common; also (120) and (012) as small faces.
Interfacial angles:
   (100):(110)=approx. 42.5°
   (001):(011)=approx. 23°
   (001):(100)=approx. 85.5°
Optical properties—biaxial negative, 2V=ca. 90°, optic normal beta=$b$
Dispersion—$r>v$, weak
Birefringence—strong The crystalline substance melting at 135–136° C. and the second crystalline substance melting at 124–125° C. are believed to be glycollic in nature, i. e., characterized by having hydroxyls on adjoining carbon. All hydroxyls are either secondary or tertiary.

The crystalline products, both narrow melting and mixed forms, may be stabilized by hydrogenation to form saturated liquid trihydric alcohols which may be esterified with lower fatty acids to form plasticizers or used per se as softeners for water-sensitive materials. The crystalline products may be dehydrated to form terpene alcohols with strong solvent power for oils and resins. They may be dehydrated and dehydrogenated to form phenols useful as antiseptics. They are useful per se in water solution as thickeners, for example, in printing pastes; mixtures with pine oil are useful as detergent aids and flotation agents.

The non-crystallizing syrup remaining after removal of crystalline products is a complex mixture with an average unsaturation of about 0.75 double bonds per terpene derivative molecule, an average hydroxyl content between 2 and 3 hydroxyls per molecule. It has a carboxyl content indicative of the presence of ketonic polyhydric alcohols and a saponifiable ester group content indicative of the presence of polyhydric esters. A considerable portion consists of unsaturated trihydric alcohols. This syrup and especially the syrup obtained without separation of crystalline products have coupling properties between water and poorly water-miscible fluids. They may also be used as thickeners and softeners for cellulose, gelatine, glue, etc.

The water-insoluble oily product formed in the process according to this invention is a useful by-product which is useful as a flotation agent in the concentration of minerals, as a detergent aid when used with soaps, as a wetting-out agent, as an aid in alkaline pulping of wood, as an aid in bleaching or other purification of cellulose pulp, and as a solvent or anti-skinning agent in paints and varnishes.

This application is a continuation-in-part of my application Serial No. 328,933, filed April 10, 1940, and of my application Serial No. 394,859, filed May 23, 1941.

What I claim and desire to protect by Letters Patent is:

1. A method of preparing a polyhydroxy terpene product containing at least three hydroxy groups which comprises reacting terpinolene with water and with free oxygen, as substantially the sole sources of oxygen in the product, at a temperature of about 0° C. to about 90° C. for at least 24 hours and separating the resulting reaction mixture into at least a water-soluble fraction containing the polyhydroxy terpene product and a water-insoluble fraction.

2. A method of preparing a polyhydroxy terpene product containing at least three hydroxyl groups which comprises reacting terpinolene with water in excess of the quantity reactive therewith and with a gas containing free oxygen, the water and free oxygen being substantially the sole sources of oxygen in the product, at a temperature of about 0° C. to about 90° C. for at least 24 hours and separating the resulting reaction mixture into at least a water-soluble fraction containing the polyhydroxy terpene product and a water-insoluble fraction.

3. A method of preparing a polyhydroxy terpene product containing at least three hydroxyl groups which comprises reacting terpinolene with water in excess of the quantity reactive therewith and with air, the water and air being substantially the sole sources of oxygen in the product, at a temperature of about 0° C. to about 90° C. for at least 24 hours and separating the resulting reaction mixture into at least a water-soluble fraction containing the polyhydroxy terpene product and a water-insoluble fraction.

4. A method of preparing a polyhydroxy terpene product containing at least three hydroxyl groups which comprises reacting a fraction consisting of a mixture of terpene compounds rich in terpinolene with water and with a gas containing free oxygen, the water and free oxygen being substantially the sole sources of oxygen in the product, at a temperature of about 0° C. to about 90° C. for at least 24 hours and separating the resulting reaction mixture into at least a water-soluble fraction containing the polyhydroxy terpene product and a water-insoluble fraction.

5. A method of preparing a polyhydroxy terpene product containing at least three hydroxyl groups which comprises reacting a mixture of unsaturated monocyclic terpenes boiling within the range of about 180° C. to about 190° C. and having a specific gravity within the range of 0.863 to 0.872, with water and with a gas containing free oxygen, the water and free oxygen being substantially the sole sources of oxygen in the product, at a temperature of about 0° C. to about 90° C. for at least 24 hours and separating the resulting reaction mixture into at least a water-soluble fraction containing the polyhydroxy terpene product and a water-insoluble fraction.

6. A method of preparing a polyhydroxy terpene product containing at least three hydroxyl groups which comprises reacting a mixture of unsaturated monocyclic terpenes boiling within the range of about 180° C. to about 190° C. and having a specific gravity within the range of 0.863 to 0.872, with water and with air, the water and air being substantially the sole sources of oxygen in the product, at a temperature of about 0°C. to about 90° C. for at least 24 hours and separating the resulting reaction mixture into at least a water-soluble fraction containing the polyhydroxy terpene product and a water-insoluble fraction.

7. A method of preparing a polyhydroxy terpene product containing at least three hydroxyl groups which comprises reacting terpinolene with water and with free oxygen under superatmospheric pressure, the water and free oxygen being substantially the sole sources of oxygen in the product, at a temperature of about 0° C. to about 90° C. for at least 24 hours and separating the resulting reaction mixture into at least a water-soluble fraction containing the poly hydroxy terpene product and a water-insoluble fraction.

8. A method of preparing a polyhydroxy terpene product containing at least three hydroxyl groups which comprises reacting terpinolene with water, with free oxygen, and with a small amount of an oxygen-carrying material serving as a catalyst, the water and free oxygen being substantially the sole sources of oxygen in the product and the catalyst material being utilized in a quantity less than a quantity having substantial oxidizing action on the terpinolene by itself, the reaction being carried out at a temperature of about 0° C. to about 90° C. for at least 24 hours and separating the resulting reaction mixture into at least a water-soluble fraction containing the polyhydroxy terpene product and a water-insoluble fraction.

9. A method of preparing a polyhydroxy terpene product containing at least three hydroxyl groups which comprises reacting terpinoline with water, with free oxygen under superatmospheric pressure, and with a small amount of an oxygen-carrying material serving as a catalyst, the water and free oxygen being substantially the sole sources of oxygen in the product and the catalyst material being utilized in a quantity less than a quantity having substantial oxidizing action on the terpinolene by itself, the reaction being carried out at a temperature of about 0° C. to about 90° C. for at least 24 hours and separating the resulting reaction mixture into at least a water-soluble fraction containing the polyhydroxy terpene product and a water-insoluble fraction.

10. A method of preparing a polyhydroxy terpene product containing at least three hydroxyl groups which comprises reacting terpinolene with water, with a gas containing free oxygen, and with a small amount of an oxygen-carrying material serving as a catalyst, the water and free oxygen being substantially the sole sources of oxygen in the product and the catalyst material being utilized in a quantity less than a quantity having substantial oxidizing action on the terpinolene by itself, the reaction being carried out at a temperature of about 0° C. to about 90° C. for at least 24 hours and separating the resulting reaction mixture into at least a water-soluble fraction containing the polyhydroxy terpene product and a water-insoluble fraction.

11. A method of preparing a polyhydroxy terpene product containing at least three hydroxyl groups which comprises reacting terpinolene with water, with free gaseous oxygen, and with a small amount of a material having active surfaces as a catalyst, the water and free oxygen being substantially the sole sources of oxygen in the product, the reaction being carried out at a temperature of about 0° C. to about 90° C. for at least 24 hours and separating the resulting reaction mixture into at least a water-soluble fraction containing the polyhydroxy terpene product and a water-insoluble fraction.

12. A method of preparing a polyhydroxy terpene product containing at least three hydroxyl groups which comprises reacting terpinolene with water, with a gas containing free oxygen, and with activated carbon as a catalyst, the water and free oxygen being substantially the sole sources of oxygen in the product, at a temperature of about 0° C. to about 90° C. for at least 24 hours and separating the resulting reaction mixture into at least a water-soluble fraction containing the polyhydroxy terpene fraction containing the polyhydroxy terpene product and a water-insoluble fraction.

13. A method of preparing a polyhydroxy terpene product containing at least three hydroxyl groups which comprises reacting terpinolene with water, with free gaseous oxygen, and with a small amount of a hydrohalide of a basic nitrogen compound as a catalyst, the water and free oxygen being substantially the sole sources of oxygen in the product, the reaction being carried out at a temperature of about 0° C. to about 90° C. for at least 24 hours and separating the resulting reaction mixture into at least a water-soluble fraction containing the polyhydroxy terpene product and a water-insoluble fraction.

14. A method of preparing a polyhydroxy terpene product containing at least three hydroxyl groups which comprises reacting terpinolene, with water, with free gaseous oxygen, and with a small amount of a compound containing an element which readily undergoes reversible changes in valence as an oxygen carrier and catalyst, the water and free oxygen being substantially the sole sources of oxygen in the product and the catalyst material being utilized in a quantity less than a quantity having substantial oxidizing action on the terpinolene by itself, the reaction being carried out at a temperature of about 0° C. to about 90° C. for at least 24 hours and separating the resulting reaction mixture into at least a water-soluble fraction containing the polyhydroxy terpene product and a water-insoluble fraction.

15. A water-soluble unsaturated trihydric terpene alcohol characterized by a bromine number of above 85, by ability to be hydrogenated, by loss of hydroxyls when heated with a small amount of iodine in para-cymene at 176° C., and by the capacity of forming monoclinic white crystals having a melting point of 135–136° C. and a refractive index of about 1.510 when crystallized from ethyl acetate.

DONALD A. LISTER.